United States Patent Office 3,238,973
Patented Mar. 8, 1966

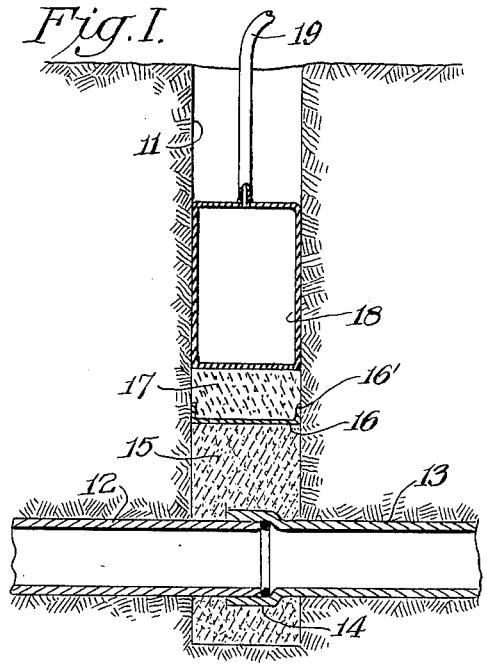
Fig. I.
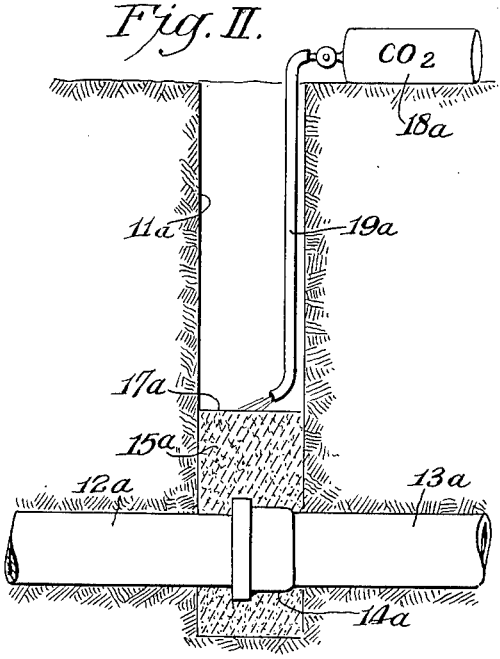
Fig. II.
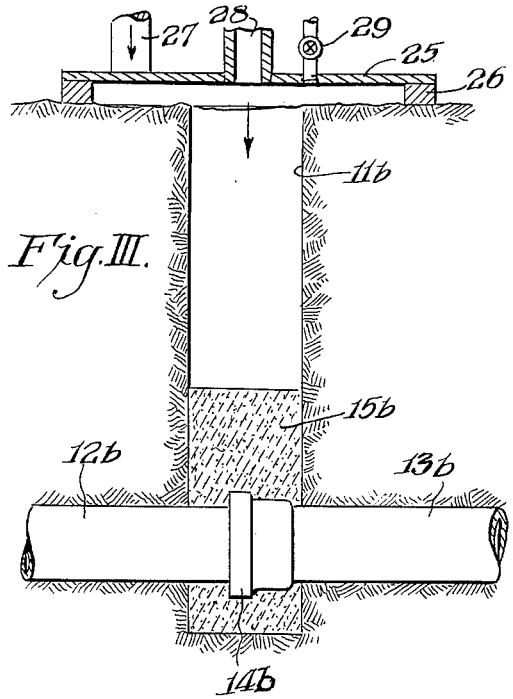
Fig. III.
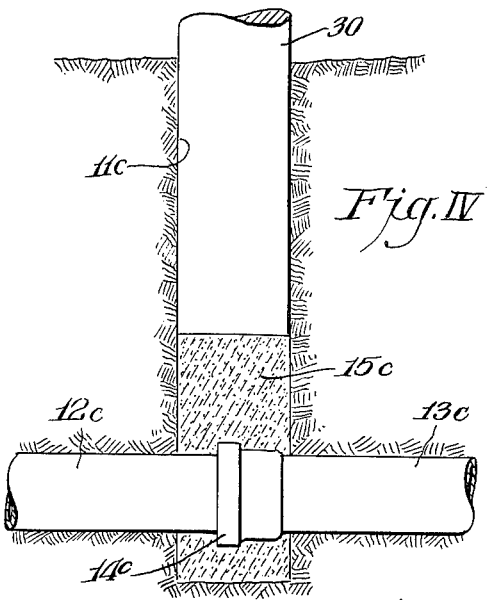
Fig. IV.
Inventor
Robert Lee Roach

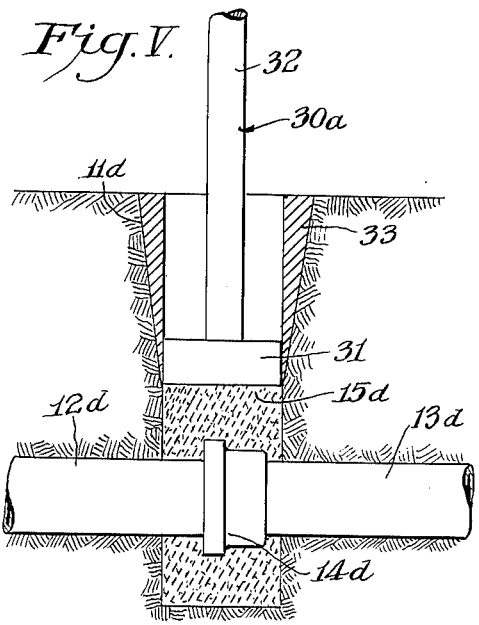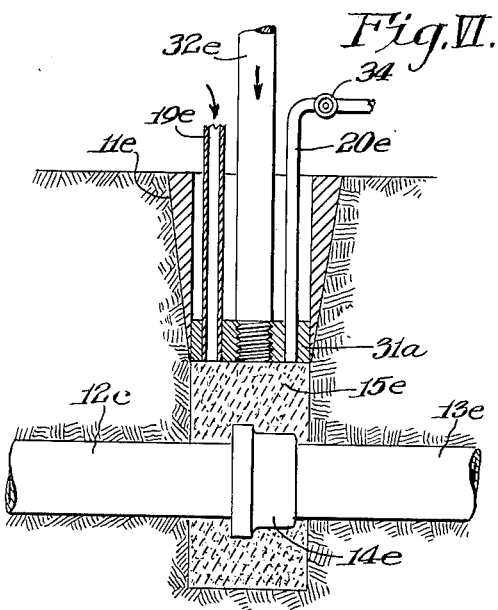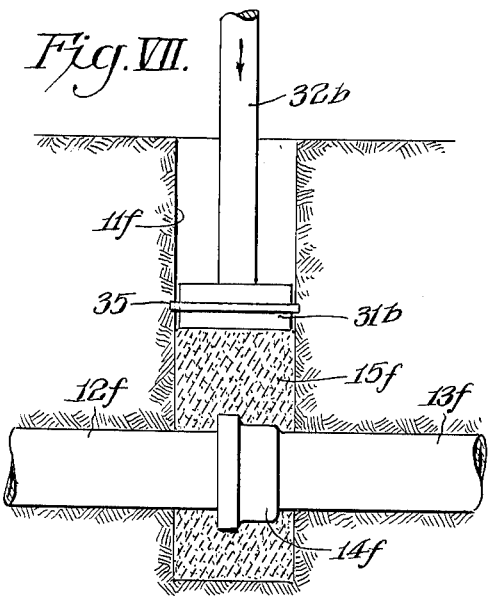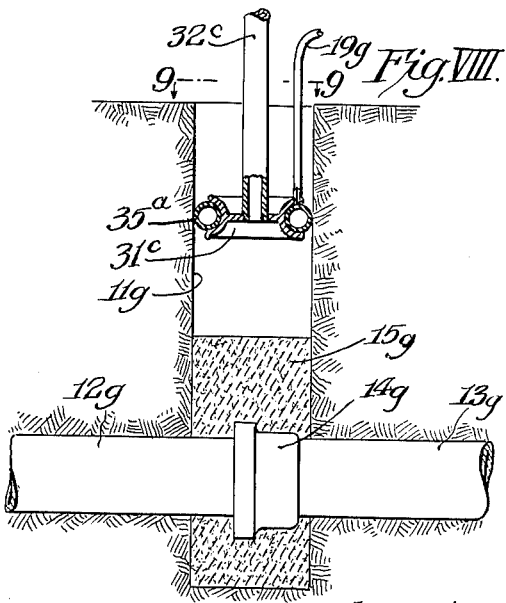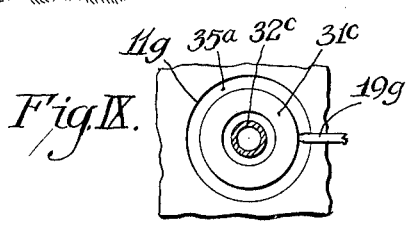

3,238,973
SEALING UNDERGROUND CONDUITS
Robert Lee Roach, Thornbury Township, Chester County, Pa., assignor to West Chester Chemical Company, Inc., West Chester, Pa., a corporation of Pennsylvania
Filed Feb. 7, 1961, Ser. No. 87,699
4 Claims. (Cl. 138—97)

This invention relates to method and apparatus for sealing leaks in underground or inaccessible fluid conduits. More particularly, the invention pertains to an improved method for repairing and/or sealing the joints of sections of conduit which are buried. Ordinarily leaks which occur in underground conduits such as gas mains or other fluid transmitting lines occur at the joints. The invention can also be applied to other leaks occurring between joints such as fractures or unsealed areas for any cause. The cause may be due to earth movements over a period of years or to some sudden disturbance in the immediate vicinity of the conduit. By means of the present invention it is possible to limit the excavation necessary to an absolute minimum and still obtain an effective seal at the conduit joint or at any section of the conduit between joints. In the past it has been necessary to excavate long and wide trenches so that the pipe sections are accessible to workmen in the trench and such procedure is both extremely expensive and time consuming.

The present invention provides methods and apparatus which effectively seal areas of underground conduit with a minimum of excavation.

The invention utilizes a coring operation to provide a bore hole directly to the section of the conduit that requires sealing. Sufficient fill is excavated around the joint or other area of the conduit to permit introduction of a thermosetting, thermoplastic or chemically setting sealant into the bore hole so that the affected area of the conduit is completely covered by the sealant. The bore hole in a preferred form of the invention is then filled with a plug and fluid pressure applied to exceed or balance the internal pressure in the conduit, thereby permitting the sealant to set or harden. In this way it is possible to stabilize the sealant around the leak in the conduit for a sufficiently long period to permit the application and hardening or setting of any suitable sealing material. The invention includes several embodiments for applying the balancing or exceeding fluid pressure and the judicial selection of the particular means will depend in large measure on the conditions present at each location.

The primary object of the invention, therefore, is to provide a quick and efficient method for effectively sealing underground conduits without interrupting the fluid flow or operation of the conduit to be repaired. A further object of the invention is to provide apparatus for statically maintaining a sealant in an underground position against the internal pressure in a conduit to be sealed until the sealant has set or hardened sufficiently.

Further objects will be apparent from the specification and drawings in which

FIGURE I is a schematic sectional view of a preferred embodiment of the present invention showing a fluid plug inserted in a bore hole or shaft for maintaining the balancing or exceeding pressure, FIGURE II is a view showing the means for introducing liquid carbon dioxide into the bore hole or shaft to assist and set up the sealant, FIGURE III is a similar view showing fluid pressure applied in the bore hole above the sealant and retained therein by means of a cap, FIGURE IV is a similar view in which the balancing or exceeding pressure on the sealant is applied by means of a piston or ram inserted in the bore hole or shaft, FIGURE V is a slight variation of the apparatus and method shown in FIGURE IV and including a liner for the upper portion of the bore hole or shaft, FIGURE VI is a variation in which a plug or piston is utilized to seal the upper part of the bore hole or shaft and fluid pressure is introduced through the piston, FIGURE VII shows a modified form of piston having an expandable element for locating and sealing against the walls of the bore hole or shaft, FIGURE VIII utilizes an inflatable or pressurized annular ring on the periphery of the piston which may be deflated while the piston is inserted and then inflated to provide suitable sealing against the walls of the shaft, and/or bore hole, and FIGURE IX is a section as seen at 9—9 of FIGURE VIII.

The invention comprises essentially the provision of a relatively small diameter bore hole or rectangular shaft sunk to the leakage area of an underground conduit which is desired to be sealed. The shaft may be formed by means of a suitable drilling apparatus of the impact or rotary type. Also the well known core boring equipment may be highly satisfactory. A suitable sealant is introduced into the bottom of the shaft in such manner that the sealant surrounds the point of leakage on the conduit. A balancing or greater pressure is then applied to the sealant to insure no further escape of fluid from the conduit until such time as the sealant has an opportunity to harden or set up. It will be understood that the selection of the sealant will depend upon the conditions existing at the area to be sealed and also the nature of the fluid in the conduit.

Referring now more particularly to the drawings:

FIGURE I portrays a preferred embodiment of the invention in which a shaft or bore hole 11 is excavated or drilled to an area in an underground conduit that is desired to be sealed. In the present instance the underground conduit comprises pipe sections 12 and 13 which are connected at bell joint 14. The bore hole 11 is excavated to a sufficient extent to expose the entire periphery of joint 14 as shown clearly in FIGURE I. After the excavation has been completed and cleaned out, a sealant 15 is introduced into the bore hole. This sealant is preferably in a liquid state and is of a thermo-setting type such as (1) Urea-formaldehyde resin.
(2) Phenol-formaldehyde resin.
(3) Epoxy resins of the aliphatic liquid type; cured with a tertiary amine.
(4) Epoxy resins of the modified liquid type comprising aromatic diepoxides plus reactive diluents such as butyl glycidyl ether or phenyl glycidyl ether to lower the viscosity; cured with a tertiary amine.
(5) Epoxy resins of the liquid aromatic type in the viscosity range 3,000 to 15,000 centipoise at 73 degrees F.; cured with a tertiary amine.
(6) Isocyanate based materials in liquid form to which a suitable curing agent is added prior to use.
(7) Acrylic monomers such as methyl methacrylate to which a suitable curing agent is added prior to use.

Examples of other materials which may be satisfactory, depending upon the soil conditions, nature of the fluid in the conduit, safety considerations and economic considerations such as cost, are:

(1) Coal tar grade RT–12 (A.S.T.M. designation D–490–47).
(2) Coal tar grade RT–12 modified by addition of 1% to 10% by weight of material or synthetic rubber.
(3) Coal tar grade RT–12 modified by addition of 1% to 10% by weight of natural or synthetic rubber and 2% to 15% gum rosin.

(4) Coal tar pitch (A.S.T.M. designation D–450–41).

(5) Coal tar pitch modified by addition of 1% to 10% by weight of natural or synthetic rubber.

(6) Coal tar pitch modified by addition of 1% to 10% by weight of natural or synthetic rubber and 2% to 15% gum rosin.

(7) Asphalt cement 60–70 penetration.

(8) Asphalt cement 60–70 penetration modified by addition of 1% to 10% by weight of natural or synthetic rubber.

(9) Asphalt cement 85–100 penetration.

(10) Asphalt cement 85–100 penetration modified by addition of 1% to 10% by weight of natural or synthetic rubber.

(11) Plasticized vinyl resins.

(12) Plasticized styrene resins.

(13) Hydraulic cements such as Portland cement to which is added suitable graded fillers such as sand, limestone and asbestos.

(14) Hydraulic cement to which is added fillers plus 1% to 40% by weight of synthetic or natural rubber latex.

With the sealant completely filling the bottom of bore 11 and surrounding the joint or leak 14 or other area in the conduit to be sealed, a piece of thin sheet material 16 such as aluminum foil is positioned on top of the sealant. Desirably, the sheet material should be somewhat larger than the bore 11 so that it extends axially from an annular flange 16'. On top of the sheet material 16 a layer of insulation 17 is inserted and this insulating material for example may be glass fiber, mineral wool, asbestos, magnesium or vermiculite. An inflatable bag 18 is then placed in the bore or shaft over the insulation and a fluid connection 19 extends from the bag 18 upwardly through the top of bore 11. Fluid pressure, either air or water, is then introduced through conduit 19 to expand the sides of the bag 18 against the walls of bore 11 and also to maintain an effective sealing pressure on the insulation which in turn transmits this pressure to the sealant around the joint 14. The pressure in sealant 15 applied through the bag 18 should, of course, be no less than the internal pressure in conduit sections 12 and 13. This insures that fluid cannot escape through the joint 14 or other leak until the sealing material 15 has had ample opportunity to harden or set up. When the joint has been sealed by reason of the hardening or setting of the sealant 15, bag 18 is deflated and removed and the bore is then filled in, thus completing the repair.

Under certain conditions the inflatable bag 18 and insulation 17 may be dispensed with and liquid carbon dioxide from tank 18a discharged directly on top of the sealant 15a. The upper surface of the sealant 17a is thereby chilled to a sufficient extent to prevent leakage from the joint 14a which connects the pipe sections 12a and 13a.

If for some reason it is not feasible to utilize a bag 18 in the bore 11, I propose to seal the top of bore 11b by means of a cap 25 having a sealing gasket or other suitable means 26 between the cap 25 and the grade surface. Any suitable weight 27, for example the ram of a hydraulic jack, can be used to maintain an effective seal between the cap 25 and gasket 26. Pressurizing fluid is introduced into the bore 11b through a pipe or conduit 28 and a suitable relief or bleed valve 29 is provided for releasing or reducing the pressure in the bore.

The modification of FIGURE IV is analogous to that of FIGURE I except that the pressure on the sealant 15c is applied by means of a ram or piston 30 which is inserted into the bore 11c and applied directly to the surface of sealant 15c. In this case the sealant is pressurized around the joint 14c between pipe sections 12c and 13c.

In FIGURE V a modified ram 30a having a piston 31 and a reduced diameter shaft 32 is employed. In this version the upper portion of bore 11d tapers outwardly to receive an annular wedge shaped seal 33 against which the piston 31 slides in fluid sealing contact. In this version the piston head 31 impinges directly against the top face of sealant 15d which surrounds the area 14d to be sealed between pipe sections 12d and 13d.

In FIGURE VI, I show a combined version of the piston of FIGURE V and the fluid pressure arrangement of FIGURE III. In this case the piston 31a is inserted in the bore 11e before the sealant 15e is introduced. A pipe or conduit 19e is then used to apply the sealant. After the sealant completely surrounds the joint 14e between pipe sections 12e and 13e fluid pressure may be introduced through conduit 20e and valve 34. In this form it is not essential to have actual pressure contact between piston 31a and the top surface of sealant 15e. The piston rod or shaft 32e may be used simply to insert and remove the piston head 31a.

In FIGURE VII a modified ram or piston 31b is used which is provided with an expanding element 35 for locking and sealing the piston head 31b against the walls of bore 11f. After the desired pressure has been applied to sealant 15f around joint 14f between sections 12f and 13f the locking device which comprises an expanding periphery is actuated to maintain the desired pressure on the sealant 15f. The piston rod 32b may be rotated or actuated to control the locking device 35.

The piston 31c having an annular expanding flange or ring 35a is shown in FIGURE VIII. The piston rod 32c is hollow to permit entry of the pressurizing fluid into the bore 11g. Sealing in the bore is achieved by inflating the annular doughnut-like gasket 35a by introducing the pressurized fluid through line 19g. This effectively seals the piston head 31c against the inner surface of bore 11g. Pressure is then introduced to the bore through conduit 32c applying the desired pressure against the upper surface of sealant 15g which surrounds the joint 14g of conduits 12g and 13g.

In all variations of the present invention it is important that the area to be sealed in the underground conduit be exposed sufficiently to contact sufficient sealant. It is, of course, especially desirable that the sealant completely enclose and surround the conduit even though the precise point to be sealed may be only on the top of the conduit or joint. The addition of a pressurizing and pressure maintaining means in the bore hole prevents any leakage from the conduit and permits a quiescent state to be maintained until the sealant sets up.

Having thus described my invention, I claim:

1. The method of sealing underground fluid conduits which comprises the steps of excavating a vertical bore hole from the ground surface to the conduit area to be sealed and to expose substantially the periphery of the conduit in the area to be sealed, introducing a sealant into said bore hole to a depth sufficient to surround the periphery of the conduit, applying a protective means on top of the sealant, introducing an inflatable means into the bore hole, inflating said inflatable means to apply pressure to the sealant at least equal to the fluid pressure in the conduit, and maintaining said pressure until the sealant has hardened.

2. The method of sealing underground fluid conduits which comprises the steps of excavating a vertical bore hole from the ground surface to the conduit area to be sealed and to expose substantially the periphery of the conduit in the area to be sealed, introducing a sealant into said bore hole to a depth sufficient to surround the periphery of the conduit, introducing piston means into said bore hole, applying pressure to said piston means at least equal to the fluid pressure in the conduit, and maintaining said pressure until the sealant has hardened.

3. The method of sealing underground conduits and the like comprising the steps of excavating a vertical bore hole from the ground surface to the conduit area to be sealed and to expose substantially the periphery of the conduit in the area to be sealed, introducing a sealant into said bore hole and in contact with the periphery of the conduit area to be sealed, inserting plug means into the bore hole above the top of the sealant, sealing the plug means against the bore hole, introducing fluid pressure to the sealant through the plug means, maintaining said fluid pressure until the sealant has set and removing said plug means.

4. The method of sealing an underground conduit which comprises the steps of excavating a vertical bore from the ground surface to the conduit area to be sealed and to expose substantially the periphery of the conduit in the area to be sealed, partially filling said bore with a hardenable sealant, closing off the upper portion of said bore, introducing fluid pressure into the bore, and maintaining pressure on the sealant until it has hardened.

References Cited by the Examiner

UNITED STATES PATENTS

| | | | |
|---|---|---|---|
| 1,221,733 | 4/1917 | Henderson | 138—90 |
| 1,506,418 | 8/1924 | Evensta et al. | 138—90 |
| 1,736,293 | 11/1929 | Van Densburg | 138—97 |
| 1,803,057 | 4/1931 | Dyer | 166—153 |
| 1,925,538 | 9/1933 | Knopp | 138—97 |
| 2,555,951 | 6/1951 | Allard | 61—53.62 |
| 2,917,085 | 12/1959 | Douse | 138—97 |

FOREIGN PATENTS 391,534    5/1933    Great Britain.

LAVERNE D. GEIGER, *Primary Examiner.*

WILLIAM I. MUSHAKE, LEWIS J. LENNY, EDWARD V. BENHAM, *Examiners.*